Patented Mar. 12, 1946

2,396,265

UNITED STATES PATENT OFFICE 2,396,265

METHOD OF PRESERVING

John M. Jackson, Chicago, Ill., assignor to American Can Company, New York, N. Y., a corporation of New Jersey No Drawing. Application June 20, 1944,
Serial No. 541,280

9 Claims. (Cl. 99—25)

The present invention relates in general to a food product and the method of preparing and preserving the same and has more particular reference to a method of preparing and packing a beverage of the cocoa-milk or cocoa-malt-milk type so that the beverage may be preserved in substantially its original goodness as regards taste and flavor and other characteristics in hermetically sealed containers for comparatively long periods of time with a minimum of spoilage or deterioration. More specifically my invention provides a method of pretreating one or more ingredients which are included in the ultimate beverage and which are rather difficult to sterilize by conventional methods.

It has been the usual practice in the past to pack various food products in hermetically sealed containers, such as sheet metal containers, and then subject the food product in the containers, usually in a retort, to comparatively long heat treatment, called processing or sterilizing, for a sufficient length of time to render the food product sterile or substantially so. Alternatively, certain food products such as acid food products, for example fruits and tomatoes, have been processed or sterilized in large vessels such as tanks for a comparatively long time and the heated food product filled into individual containers and hermetically sealed therein. Such heat treatment, packing or filling and sealing have sometimes been accomplished with the aid of vacuum.

These methods are still being practiced with more or less success and with a tolerable percentage of spoilage and are generally satisfactory with a great many food products, such as fruits, tomatoes, meats and non-acid vegetables such as peas, corn, etc.

However, other food products, such as the type of beverages which contain milk and where flavor and taste are important factors are more difficult to preserve by methods wherein the heat treatment is comparatively long. Milk when heated too long caramelizes and acquires a cooked taste or flavor. It is therefore desirable to process such milk beverages as cocoa-milk or cocoa-malt-milk by the so-called "high-short" process. This means a process where high temperatures are used for only a short period of time.

I discovered, in using this "high-short" process in connection with the packing of such beverages as cocoa-milk or cocoa-malt-milk, that the harmful spoilage micro-organisms which are present in cocoa and/or malt substantially resisted this process and occasioned spoilage beyond a tolerable limit. Apparently, these spoilage micro-organisms fortify themselves in the fatty and/or starchy and/or insoluble fibrous constituents of the cocoa and/or malt. I found that the lethal effect of high temperatures and comparatively long processing time would destroy these spoilage micro-organisms, but I also found that such "high-long" process would also deleteriously affect the taste or flavor and other physical characteristics of the cocoa-milk or cocoa-malt-milk beverage and after extensive experimentation I finally solved the problem and made the invention more particularly described hereinafter.

One objective of my invention, therefore, is to provide a novel method of preparing a beverage of the cocoa-milk or cocoa-malt-milk type involving a bactericidal treatment or pretreatment of the cocoa or cocoa-malt ingredients, which, when ultimately combined with the milk, will produce a wholesome beverage that can be preserved in hermetically sealed containers for long periods of time substantially without spoilage.

Another object of my invention resides in the provision of a novel method of preparing such a beverage which will render the beverage substantially free of harmful spoilage micro-organisms without affecting the physical nature, nutritive value or taste and flavor of the beverage.

Still another important object of my invention is the provision of such a novel method which is highly economical in that it will produce a wholesome palatable beverage with a minimum of processing time and at comparatively low processing temperatures.

More specifically my invention provides a novel method of bactericidally pretreating the cocoa, or cocoa-malt or malt ingredient of a food product by making a syrup or water sludge or slurry of said ingredient, and mixing with said sludge or slurry a harmless acid to reduce the normal pH value of said slurry, heat treating the same and then restoring the pH value to normal by means of a compatible alkalizing agent, before mixing said pretreated slurry with the other ingredients, such as milk, which make up the ultimate food product.

Numerous other objects and advantages of my invention will be apparent as it is better understood from the following description which is a preferred embodiment thereof.

After attempting to preserve cocoa-milk and/or cocoa-malt-milk beverages or drinks by means of the old processing methods including the "high-short" sterilizing method with rather unsatisfactory results as regards keeping and taste qualities and after extensive experimentation I made the unexpected discovery that by positively acidifying the cocoa or cocoa-malt syrup or slurry, from which the ultimate beverage is prepared, to a pH level of below 5 preferably between 4 and 5 with a certain amount of a suitable acid, for example, hydrochloric acid and heating the slurry for at least five minutes at a temperature of at least 190 degrees Fahrenheit, I not only reduced the formerly required processing times and temperatures but at the same time reduced the bacterial count in the treated product to substantially zero. This acidification step however raised another serious problem. The normal pH level of the cocoa or cocoa-malt slurry is somewhere above 6, preferably between 6 and 7. Reducing the pH of the slurry to a point below 5 not only affected the normal taste of the ultimate beverage but also its physical characteristics, causing some coagulation and tendency toward sedimentation. After considerable further experimentation, I made the further discovery that the normal taste of the ultimate beverage could be restored by the addition of a compatible neutralizing alkali such as sodium hydroxide or anhydrous disodium phosphate or ammonium hydroxide (28% ammonia), or other suitable alkalis.

In order to exemplify one of several possible applications of my discovery and invention I shall describe below a preferred embodiment thereof:

Sixty gallons (about 500 pounds) of water are run into a 100 gallon stainless steel kettle and approximately 9.5 pounds of concentrated hydrochloric acid (37%) are added. The acidified water is then heated to about 200 degrees Fahrenheit (but not below 190 degrees Fahrenheit and not above 212 degrees Fahrenheit), for example by direct steam injection. After this temperature is reached approximately 188 pounds of cocoa powder and (in case the malt ingredient is also desired) 44 pounds of malt syrup are added with constant stirring and steam injection. The sequence of steps of preparing the slurry may be varied somewhat so long as all the ingredients are finally mixed together and heat treated. For example, the acid may be added to the cocoa or cocoa-malt water slurry.

The normal pH of cocoa or cocoa-malt slurry (i. e. water plus cocoa plus malt without acid) is above 6 and preferably between 6 and 7. The addition of the hydrochloric acid in the approximately stated quantity reduces the pH of the slurry to below 5 and preferably between 4 and 5. The acidified slurry mixture is then held at a minimum temperature of about 190 degrees Fahrenheit, but in no event above the boiling point, for at least 5 minutes, the preferred temperature and time being about 200 degrees Fahrenheit for about 30 minutes. Following this treatment approximately 4.125 pounds of sodium hydroxide are added with constant stirring which raises the pH value of the mixture to above 6, preferably between 6 and 7.

The acidified and neutralized cocoa or cocoa-malt slurry thus obtained contains sufficient cocoa and/or malt to be mixed with about 1500 gallons of milk, preferably full cream milk, in order to make a wholesome, palatable and highly nutritious cocoa-milk or cocoa-malt-milk drink. If desired, certain sweeting, flavoring and stabilizing ingredients may be added directly to the milk.

The cocoa-milk or cocoa-malt-milk mixture thus prepared may then be further processed and filled and sealed into containers by treating and filling this mixture preferably by means of the so-called "high-short" processing method. This method may be carried out in conjunction with or by means of the apparatus and method shown and described in United States Patent No. 2,029,303, granted February 4, 1936 to Charles O. Ball.

While malt syrup is preferably used, malt in syrup form is not always available, in which case dry powdered malt may be substituted. When dry powdered malt is used approximately 34 pounds are added to the quantity of cocoa above mentioned.

As heretofore indicated the malt ingredient may be omitted entirely from the slurry or from the ultimate beverage. A palatable cocoa-milk beverage can be prepared, as per the above cited example, without the use of malt. Omission of the comparatively small proportion of malt does not change the cited formula to any appreciable degree.

Also satisfactory results can be obtained by omitting the malt from the acidification procedure and instead adding it to the acidified cocoa slurry with the milk and other ingredients.

While I have found that hydrochloric acid is best suited for the exemplified embodiment of my invention, other organic and inorganic acids, such as citric acid, lactic acid, tartaric acid, formic acid, phosphoric acid and sulphuric acid in readily calculated proportions are suitable.

Also I have found that sodium hydroxide may be substituted by anhydrous disodium phosphate or ammonium hydroxide (28% ammonia). When anhydrous disodium phosphate is used as a neutralizing agent to neutralize hydrochloric acid, a larger quantity, i. e. approximately 35 pounds of anhydrous disodium phosphate must be added to the acidified cocoa or cocoa-malt slurry in order to restore the slurry to the pH level of from 6 to 7.

When ammonium hydroxide (28% ammonia) is used as a neutralizing agent to neutralize hydrochloric acid, approximately 5.1 pounds of ammonium hydroxide (28% ammonia) would be required for neutralizing the batch of the acidified slurry aforementioned. The use of weaker acids for acidification would require correspondingly greater quantities of alkali for neutralization.

The use of hydrochloric acid as the acidifying agent and the use of sodium hydroxide as the acid neutralizing agent are preferred because this acid and alkali react to form a palatable salt and water. They are also preferred because, since they are a strong acid and a strong base, the molar quantities required of each are less than those for weak acids and weak bases.

The following table shows revised proportions when phosphoric acid (ortho—85%) and lactic acid (85%) are substituted for hydrochloric acid in the aforementioned formulae and also shows the revised proportions of sodium hydroxide, anhydrous disodium phosphate and ammonium hydroxide (28% ammonia) when these alkalizing agents are used in connection with these acid substitutes.

| Acid | Amount to add to batch containing 188 lbs. cocoa, etc. | Alkali | Amount to neutralize to original pH |
|---|---|---|---|
| Phosphoric (ortho—85%) | 10.5 lbs. (to pH=4.4) | Sodium hydroxide | 6.7 lbs. |
|  |  | Anhydrous disodium phosphate | 57 lbs. |
|  |  | Ammonium hydroxide (26% ammonia) | 8.3 lbs. |
| Lactic acid (85%) | 12.2 lbs. (to pH=4.3) | Sodium hydroxide | 5.4 lbs. |
|  |  | Anhydrous disodium phosphate | 46 lbs. |
|  |  | Ammonium hydroxide (28% ammonia) | 6.7 lbs. |

From the several formulae disclosed other substitute formulae may be readily calculated by those skilled in the art.

The cocoa or cocoa-malt slurry may be prepared with milk or skim milk instead of water. Care must be taken, however, in such a procedure that the milk does not curdle, or if curdling does occur care must be taken to disperse the curd so finely in the ultimate beverage that it would not be objectionable.

By the herein above described invention I have been able to reduce the spoilage of canned cocoa-milk or cocoa-malt-milk beverage from about fourteen cans per thousand when old methods of procedure were used to less than one can per thousand when my herein described invention is used.

It is thought that the invention and many of its attendant advantages will be understood from the foregoing description, and it will be apparent that various changes may be made in the steps of the process described, their order of accomplishment and their proportions without departing from the spirit and scope of the invention or sacrificing all of its material advantages, the process hereinbefore described being merely a preferred embodiment thereof.

I claim:

1. The method of preparing a beverage which contains cocoa and milk and preserving the same in hermetically sealed containers, which comprises providing a water slurry of cocoa and hydrochloric acid, said acid being present in said slurry in a quantity sufficient to reduce the pH value of said slurry to below 5, heating said slurry to a temperature of at least 190 degrees Fahrenheit for at least 5 minutes, adding anhydrous disodium phosphate to said acidified and heated slurry in a quantity sufficient to raise its pH value to above 6, and then adding a quantity of milk to said mixture and heat sterilizing the resulting beverage and filling it into containers and sealing said containers under substantially sterile conditions.

2. The method of preparing a beverage which contains cocoa and milk and preserving the same in hermetically sealed containers, which comprises providing a water slurry of cocoa and hydrochloric acid, said acid being present in said slurry in a quantity sufficient to reduce the pH value of said slurry to below 5, heating said slurry to a temperature of at least 190 degrees Fahrenheit for at least 5 minutes, adding ammonium hydroxide to said acidified and heated slurry in a quantity sufficient to raise its pH value to above 6, then adding a quantity of milk to said mixture and heat sterilizing the resulting beverage and filling it into containers and sealing said containers under substantially sterile conditions.

3. The method of preparing a beverage which contains cocoa and milk and preserving the same in hermetically sealed containers, which comprises providing a water slurry of cocoa, malt and hydrochloric acid and heating the same, said acid being present in said slurry in sufficient quantity to reduce the pH value of said slurry to between 4 and 5, maintaining said slurry at a temperature of not less than 190 degrees Fahrenheit for at least 5 minutes, then adding a quantity of sodium hydroxide sufficient to raise the pH value of said slurry to approximately its normal value of between 6 and 7, then adding a quantity of milk to said mixture and heat sterilizing the resulting beverage and filling it into containers and sealing said containers under substantially sterile conditions.

4. The method of preparing a beverage which contains cocoa and milk and preserving the same in hermetically sealed containers, which comprises providing a water slurry of cocoa, malt and hydrochloric acid and heating the same, said acid being present in said slurry in a quantity sufficient to reduce the pH value of said slurry to below 5, maintaining said mixture at a temperature of about 200 degrees Fahrenheit for about 30 minutes then adding a quantity of sodium hydroxide sufficient to raise the pH value of said slurry to above 6, then adding a quantity of milk to said mixture and heat sterilizing the resulting beverage and filling it into containers and sealing said containers under substantially sterile conditions.

5. The method of preparing a beverage which contains cocoa and milk and preserving the same in hermetically sealed containers, which comprises adding to a slurry of water and cocoa phosphoric acid in a quantity sufficient to reduce the pH value of said slurry to below 5, heating said slurry to at least 190 degrees Fahrenheit for at least five minutes, whereby substantially all spoilage organisms are destroyed, raising the pH value of said slurry to above 6 by the addition of a compatible alkali, adding to said mixture a quantity of milk, sterilizing the resulting beverage and filling the same into containers and hermetically sealing the containers.

6. The method of preparing a beverage which contains cocoa and milk and preserving the same in hermetically sealed containers, which comprises adding to a slurry of water and cocoa lactic acid in a quantity sufficient to reduce the pH value of said slurry to 5, heating said slurry to at least 190 degrees Fahrenheit for at least five minutes, whereby substantially all spoilage organisms are destroyed, raising the pH value of said slurry to above 6 by the addition of a compatible alkali, adding to said mixture a quantity of mlik, sterilizing the resulting beverage and filling the same into containers and hermetically sealing the containers.

7. The method of preparing a beverage which contains cocoa and milk and preserving the same in hermetically sealed containers, which comprises providing a quantity of water and an acid and heating the same, mixing with said acidified and heated water a quantity of cocoa to provide a slurry, said acid being present in said slurry in a quantity sufficient to reduce the pH value of said slurry to below 5, maintaining said slurry at a temperature of at least 190 degrees Fahrenheit for at least five minutes, then adding a quantity of a compatible alkalizing agent sufficient to raise the pH value of said mixture to above 6, then adding a quantity of milk to said mixture and heat sterilizing the resulting beverage and filling it into containers and hermetically sealing said containers.

8. The process of preparing a beverage which contains cocoa and milk and preserving the same in hermetically sealed containers, which comprises adding to a slurry of water and cocoa an acid in quantity sufficient to reduce the pH value of said slurry to between 4 and 5, heating said slurry to about 190 degrees Fahrenheit for at least 5 minutes, whereby substantially all spoilage organisms are destroyed, raising the pH value of said slurry to between 6 and 7 by the addition of a compatible alkali, adding to said mixture a quantity of milk, sterilizing said ultimate beverage and filling the same into containers and hermetically sealing the containers.

9. The method of preparing a beverage which contains cocoa and milk, and preserving the same in hermetically sealed containers, which comprises providing a water slurry of cocoa and an acid, the acid being in quantity sufficient to reduce the pH value of said slurry to below 5, heating said slurry to a temperature of about 190 degrees F. for at least five minutes, adding a compatible alkalizing agent sufficient to raise the pH value of said mixture to above 6, adding to said mixture a quantity of milk, sterilizing the resulting beverage, filling the same into containers, and hermetically sealing said containers.

JOHN M. JACKSON.